US008012354B2

(12) United States Patent  
Dueppen et al.

(10) Patent No.: US 8,012,354 B2
(45) Date of Patent: *Sep. 6, 2011

(54) EXTRACTION AND WINTERIZATION OF LIPIDS FROM OILSEED AND MICROBIAL SOURCES

(75) Inventors: Daniel G. Dueppen, Lexington, KY (US); Samuel G. Zeller, Severn, MD (US); Sandra I. Diltz, Severn, MD (US); Robert H. Driver, New Canaan, CT (US)

(73) Assignee: Martek Biosciences Corporation, Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/757,383

(22) Filed: Apr. 9, 2010

(65) Prior Publication Data

US 2010/0261919 A1 Oct. 14, 2010

Related U.S. Application Data

(63) Continuation of application No. 12/184,974, filed on Aug. 1, 2008, now Pat. No. 7,695,626, which is a continuation of application No. 10/498,598, filed as application No. PCT/US02/39930 on Dec. 12, 2002, now Pat. No. 7,419,596.

(60) Provisional application No. 60/341,180, filed on Dec. 12, 2001.

(51) Int. Cl.
*B01D 11/00* (2006.01)
*C11B 1/10* (2006.01)

(52) U.S. Cl. ........ 210/634; 210/639; 210/702; 210/774; 210/787; 210/806; 554/12; 554/20; 435/134; 426/439; 426/430; 426/601

(58) Field of Classification Search .................. 210/634, 210/650, 651, 702, 734, 774, 804, 806, 639, 210/787; 554/1, 175, 186, 224; 435/134; 426/429, 430, 601

See application file for complete search history.

(56) References Cited

U.S. PATENT DOCUMENTS 3,541,123 A 11/1970 Kawada et al.
(Continued)

FOREIGN PATENT DOCUMENTS

CN 1304986 A 7/2001
(Continued)

OTHER PUBLICATIONS

Bailey, B., et al., *Marine Oils With Particular Reference to Those of Canada*, pp. 262-265, The Fisheries Research Board of Canada, CA (1952).
(Continued)

*Primary Examiner* — Joseph W Drodge
(74) *Attorney, Agent, or Firm* — Sterne, Kessler, Goldstein & Fox P.L.L.C.

(57) ABSTRACT

A process for purifying a lipid composition having predominantly neutral lipid components having at least one long chain polyunsaturated fatty acid is disclosed. The process employs contacting the lipid composition with a polar solvent, such as acetone, wherein the solvent is selected such that contaminants are less soluble in the solvent than is the long chain polyunsaturated fatty acid. The process is typically conducted at cooler temperatures, including about 0° C. Upon precipitation of the contaminants from the lipid composition, a separation is conducted to remove the precipitated material from the lipid composition. The long chain polyunsaturated fatty acids can include ARA, DPA, EPA, and/or DHA. The process of the present invention effectively winterizes lipid compositions, thereby reducing the tendency of such compositions to become hazy.

31 Claims, 5 Drawing Sheets

Overview of the DHA-rich lipid extraction process using hexane

U.S. PATENT DOCUMENTS

| | | | |
|---|---|---|---|
| 3,944,585 | A | 3/1976 | Luddy et al. |
| 4,205,006 | A | 5/1980 | Luddy et al. |
| 4,615,839 | A | 10/1986 | Seto et al. |
| 4,792,418 | A | 12/1988 | Rubin et al. |
| 4,870,011 | A * | 9/1989 | Suzuki et al. ............... 435/134 |
| 5,322,780 | A * | 6/1994 | Kawashima et al. ......... 435/134 |
| 5,336,792 | A | 8/1994 | Sola et al. |
| 5,539,133 | A | 7/1996 | Kohn et al. |
| 5,658,767 | A | 8/1997 | Kyle |
| 6,020,020 | A | 2/2000 | Cain et al. |
| 6,140,486 | A | 10/2000 | Facciotti et al. |
| 6,166,230 | A * | 12/2000 | Bijl et al. ........................ 554/1 |
| 6,344,574 | B1 | 2/2002 | Foglia et al. |
| 6,441,208 | B2 | 8/2002 | Bijl et al. |
| 6,461,839 | B2 | 10/2002 | Yokochi et al. |
| 6,492,537 | B2 * | 12/2002 | Foglia et al. ...................... 554/20 |
| 6,750,048 | B2 * | 6/2004 | Ruecker et al. ............... 435/134 |
| 7,087,432 | B2 | 8/2006 | Qiu et al. |
| 7,419,596 | B2 * | 9/2008 | Dueppen et al. .............. 210/634 |
| 7,695,626 | B2 * | 4/2010 | Dueppen et al. .............. 210/634 |
| 2004/0059142 | A1 | 3/2004 | Bijl et al. |
| 2004/0209953 | A1 * | 10/2004 | Wai Lee ........................ 514/547 |
| 2005/0129831 | A1 | 6/2005 | Fabritius |

FOREIGN PATENT DOCUMENTS

| | | |
|---|---|---|
| EP | 1 215 274 A1 | 6/2002 |
| JP | 59-59644 A | 4/1984 |
| JP | 59-67241 A | 4/1984 |
| JP | 60-133094 A | 7/1985 |
| JP | 61-192292 A | 8/1986 |
| JP | 2002-345452 | 12/2002 |
| WO | WO 86/04354 A1 | 7/1986 |
| WO | WO 97/36996 A2 | 10/1997 |
| WO | WO 98/03671 | 1/1998 |
| WO | WO 03/049832 A1 | 6/2003 |

OTHER PUBLICATIONS

Hoffmann, G., "The Chemistry and Technology of Edible Oils and Fats and their High Fat Products," *Food Science and Technology* 256-261, Academic Press Ltd, UK (1989).

Lee, K., et al., "Fractionation of Menhaden Oil and Partially Hydrogenated Menhaden Oil: Characterization of Triacylglycerol Fractions," *JAOCS* 78(3): 297-303, AOCS Press, US (2001).

Neumunz, G., "Old and New in Winterizing," *J. Am. Oil Chemists' Soc. 55*: 396A-398A, American Oil Chemists' Society, US (1978).

Yokochi, T., et al., "Increase in the γ-Linolenic Acid Content by Solvent Winterization of Fungal Oil Extracted from *Mortierella Genus*," *JAOCS 67*(11): 846-851, American Oil Chemists' Society, US (1990).

International Search Report for International Application No. PCT/US02/39930, ISA/US, Washington, D.C., mailed on Mar. 26, 2003.

International Preliminary Examination Report dated Nov. 17, 2003 for International Application No. PCT/US02/39930, IPEA/US, Alexandria, VA, completed on Oct. 24, 2003.

Supplementary European Search Report for EP Application No. EP 02 79 1414, The Hague, search completed on Jun. 22, 2005, 2 pages.

Extended European Search Report for EP Application No. EP 10 16 6318, Munich, search completed on Aug. 31, 2010, 3 pages.

English language abstract of JP 2002-345452 (listed as document FP10 on the accompanying form PTO/SB/08a).

* cited by examiner

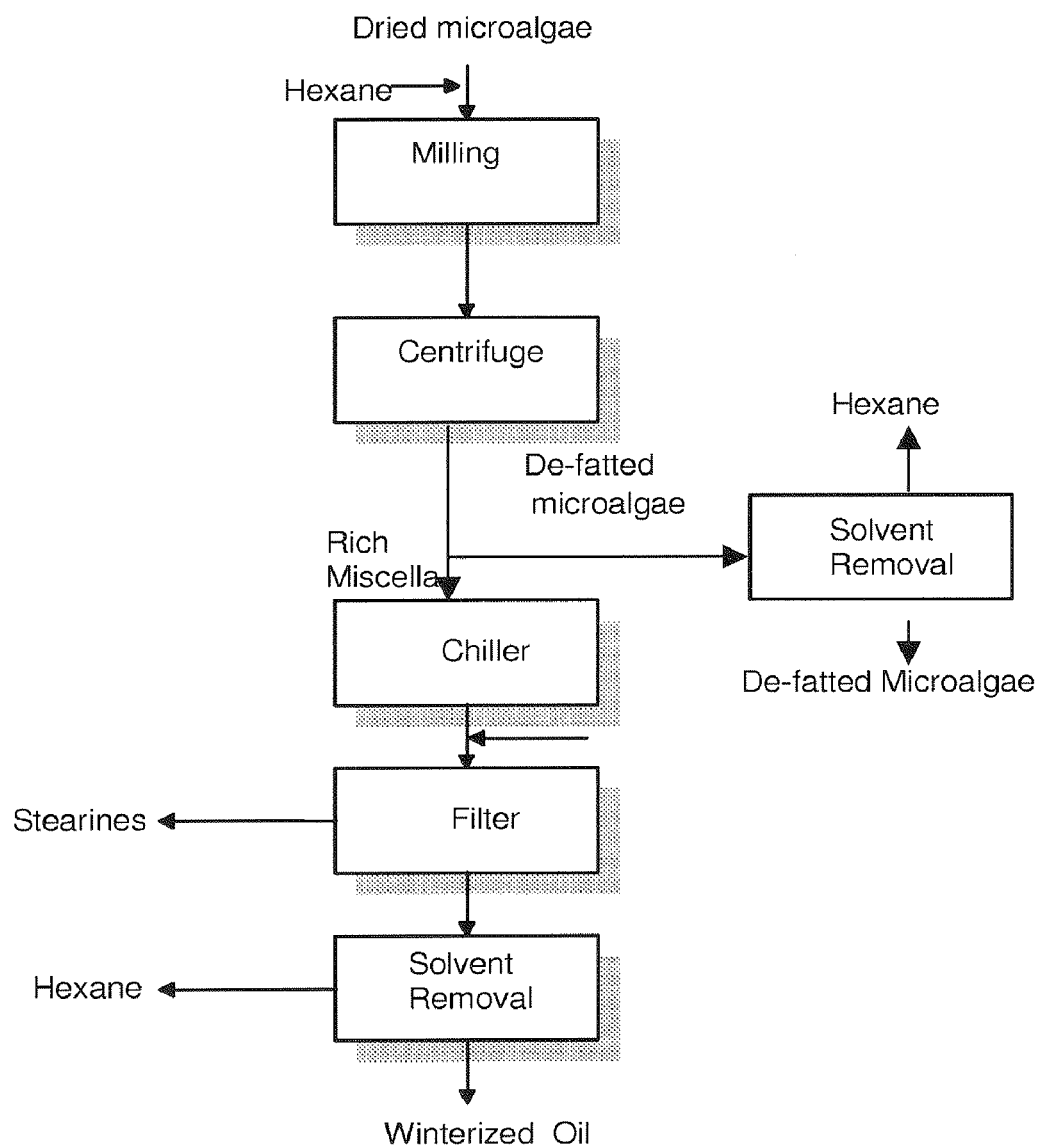
Figure 1. Overview of the DHA-rich lipid extraction process using hexane

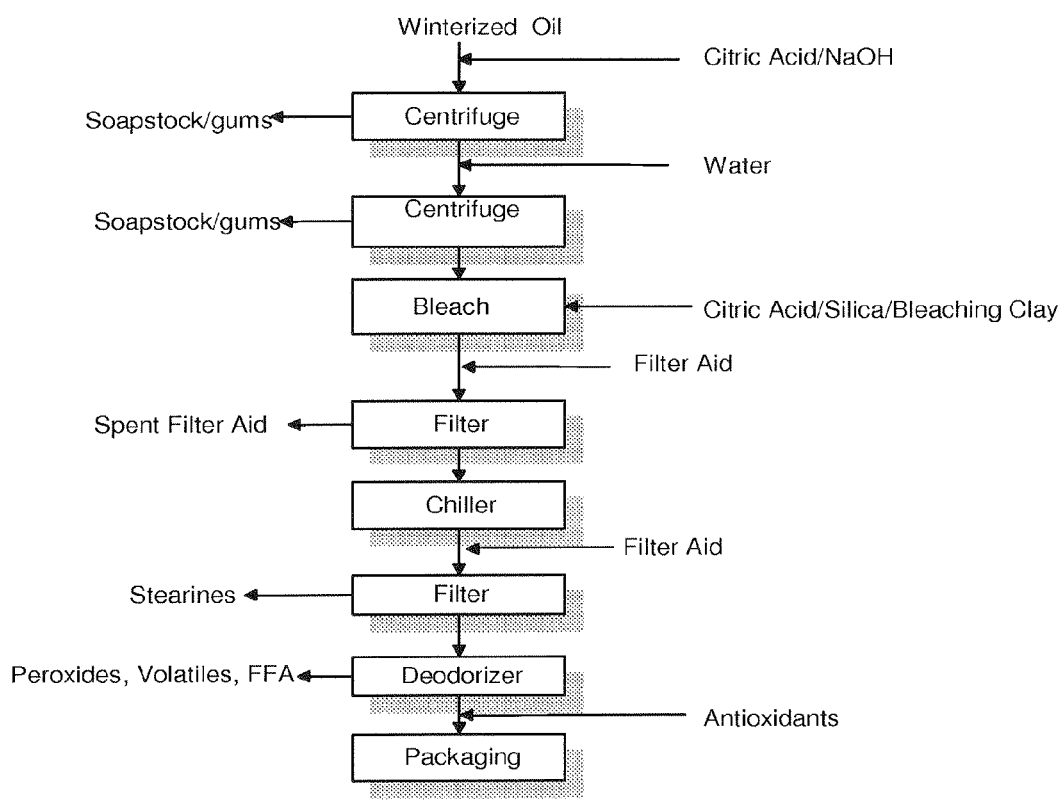
Figure 2. Overview of the DHA-rich lipid purification process

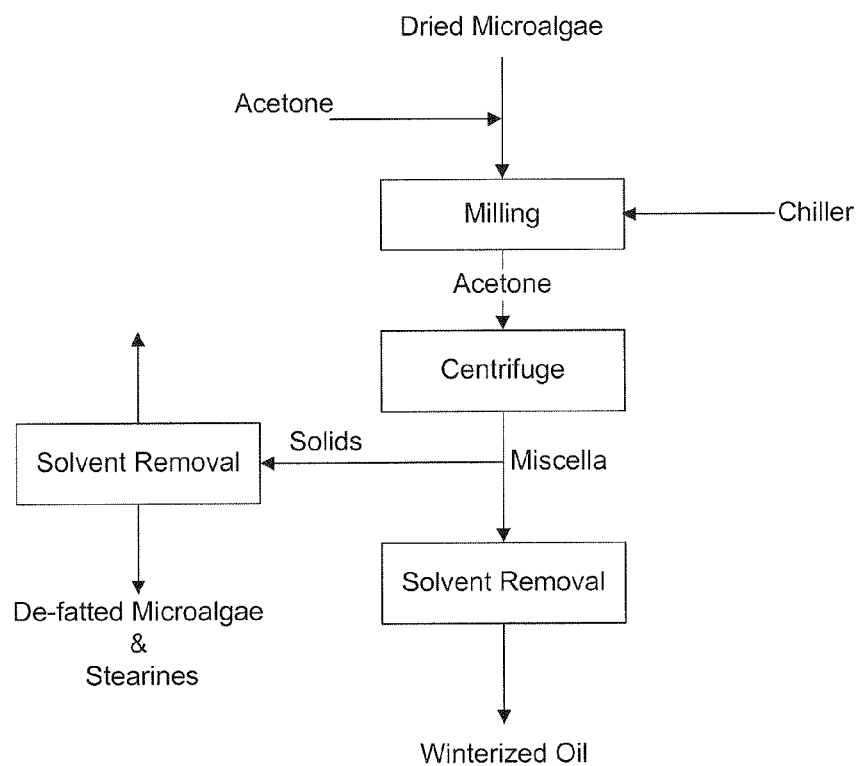
Figure 3. Overview of the DHA-rich lipid extraction process using acetone in one step

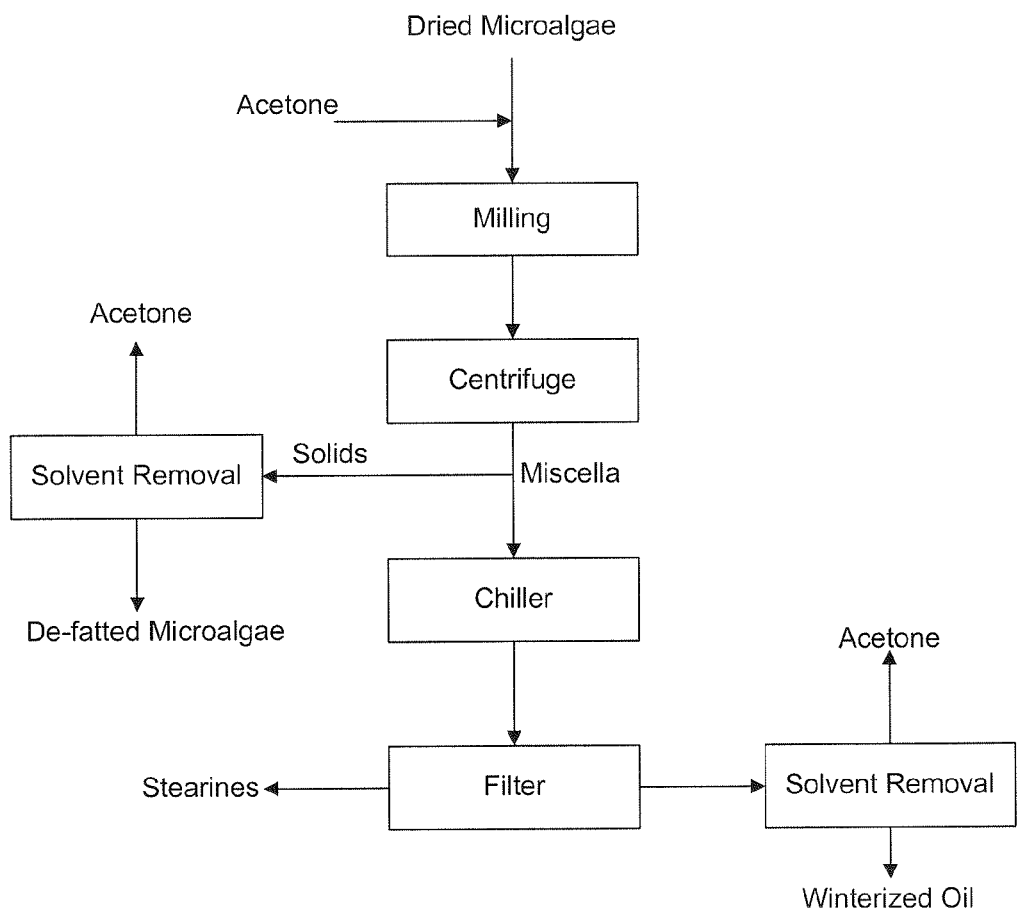
Figure 4. Oerview of the DHA-rich lipid extraction process using acetone in two steps

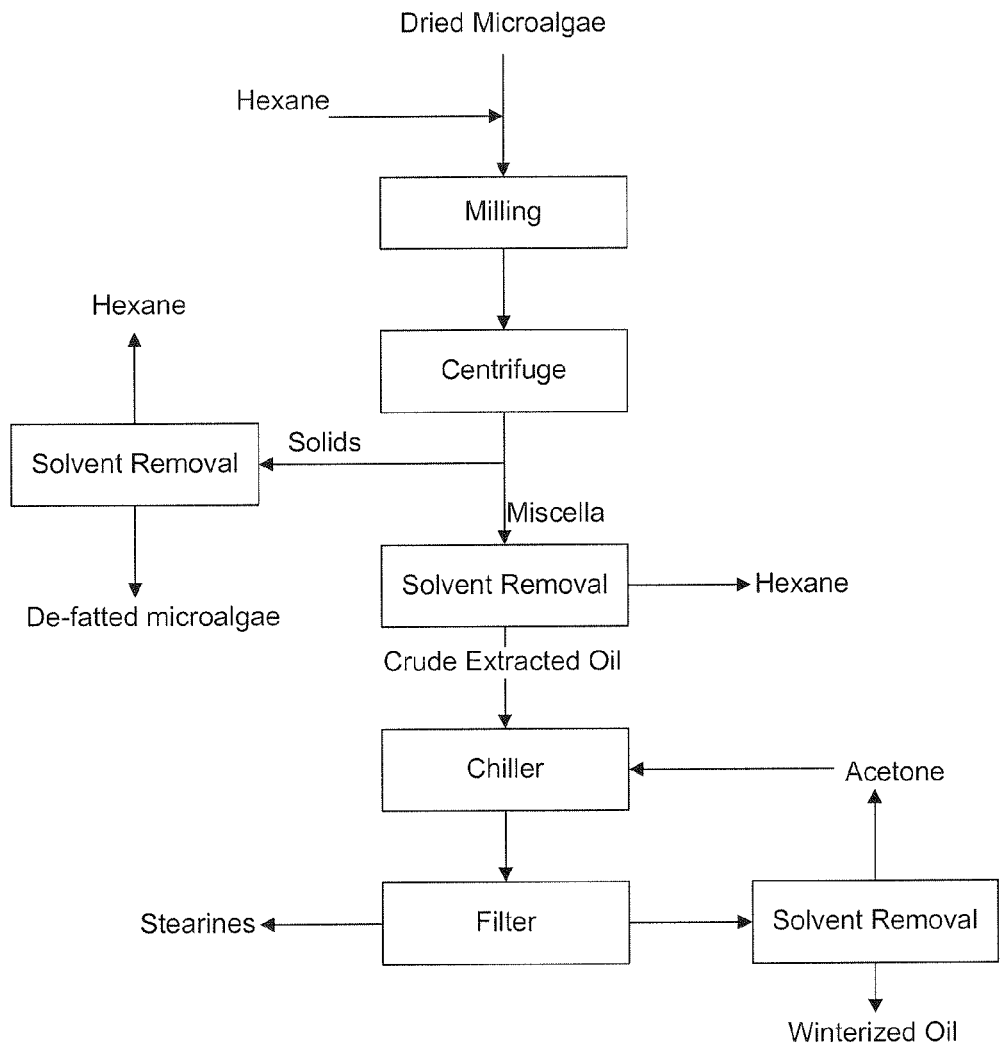
Figure 5. DHA-rich lipid hexane extraction process and acetone winterization

EXTRACTION AND WINTERIZATION OF LIPIDS FROM OILSEED AND MICROBIAL SOURCES

This application is a continuation of U.S. application Ser. No. 12/184,974, filed Aug. 1, 2008, which is a continuation of U.S. application Ser. No. 10/498,598, filed Dec. 12, 2002, now U.S. Pat. No. 7,419,596, which is a 35 U.S.C. §371 National Phase of International Appl. No. PCT/US2002/039930, filed Dec. 12, 2002, which claims benefit under 35 U.S.C. §119(e) to U.S. Appl. No. 60/341,180, filed Dec. 12, 2001.

FIELD OF THE INVENTION

The present invention is directed to the extraction and purification of lipids, and in particular, lipids containing long chain polyunsaturated fatty acids (LCPUFAs). In particular, processes are provided for obtaining high concentrations of desired LCPUFAs and low concentrations of undesired compounds such as trisaturated glycerides.

BACKGROUND OF THE INVENTION

In general, winterization is the name given to the process of removing sediment that appears in vegetable oils at low temperature. It originated from the early practice of allowing cottonseed oil to remain in outdoor storage during the cool winter months and filtering off the sediment-free oil. Dry fractional crystallization is a process wherein triglycerides with the highest melting temperature preferentially crystallize during cooling from a neat liquid (e.g., liquid lipid). After crystallization is complete, the solid phase is separated from the liquid phase by one of several types of physical processes. Alternatively, solvent crystallization is used to promote triglyceride crystal formation, because triglycerides at low temperature generally form more stable crystals with solvent than without solvent.

Docosahexaenoic acid (DHA)-rich lipid was extracted using conventional techniques and solvents (e.g., hexane) from *Schizochytrium* sp. biomass produced by fermentation, and the resulting extracted lipid was winterized by chilling it to −2 to 2° C. followed by centrifugation. The lipid was then refined, bleached and deodorized, and put into gelatin capsules for sale as nutritional supplements. A problem arose with this product in that a haze would form in the product over time.

In one process for recovering lipids from biomass, as illustrated in FIG. 1, dried microalgae are suspended in commercial-grade n-hexane and wet milled. Hexane primarily extracts triglycerides, diglycerides, monoglycerides and esterified sterols, although other components of the total lipid fraction, such as phospholipids, free sterols and carotenoids, can also be extracted to a lesser degree. Centrifugation is employed to separate spent biomass from a lipid-rich miscella. The resultant mixture of lipid and solvent is referred to as miscella. The lipid content of the clarified miscella is adjusted to about 45 wt % using n-hexane. The miscella is winterized, in particular, the miscella is chilled to approximately −1° C., and held for 8 to 12 hours, to crystallize any saturated fats, or high melting point components. The miscella is then filtered to remove the crystallized stearine phase. Hexane is removed from the miscella, leaving behind the winterized lipid.

As illustrated in FIG. 2, the winterized lipid is heated and treated with citric acid or phosphoric acid to hydrate any phosphatides present in the lipid. Sodium hydroxide is added to neutralize any free fatty acids present. The resulting gums (hydrated phosphatides) and soapstock (neutralized fatty acids) are removed using a centrifuge. The lipid is mixed with water and re-centrifuged to remove any residual gum/soapstock. This step can be carried out with the first centrifugation. The refined lipid is bleached with silica and bleaching clay following pre-treatment with citric acid, to remove peroxides, color compounds, and traces of soapstock, phospholipids and metals. Filter aid is added at the end of the cycle to facilitate removal of the spent bleaching compounds from the lipid via filtration.

An additional step can be performed, where the bleached lipid is chilled to from about 5° C. to about 15° C. and held for about 6 to about 8 hours to crystallize any remaining stearines or waxes, if it is apparent that a sediment layer will form upon standing. Filter aid can be used to facilitate removal of the crystals via filtration, if this step is performed.

A deodorizer, operated at elevated temperatures under high vacuum, is used to destroy peroxides, which if left intact could later decompose and initiate free radical reactions. This step also removes any remaining low molecular weight compounds that can cause off-odors and flavors. Contact times in the deodorizer are minimized to prevent the formation of trans-fatty acids. Safe and suitable food approved antioxidants are added. The stabilized lipid is packaged in a phenolic-lined metal container under a nitrogen atmosphere to prevent oxidation.

The haze that formed in the lipid-filled gelatin capsules was analyzed and found to be composed of crystals of triglycerides containing myristic (14:0) and palmitic (16:0) fatty acids, a trisaturated fatty acid glyceride. These crystals had a melting point of about 50-55° C. The trisaturated glycerides comprised 6-8% of the crude extracted lipid. The above-described winterization process lowered the concentration of these trisaturated glycerides to <1%; however, not low enough to completely eliminate haze formation in the lipid. Additionally, about 30% of the lipids, and a corresponding 30% of the DHA, is removed in this traditional hexane (55% hexane and 45% crude oil) winterization process. Another problem was that when the temperature was lowered to crystallize the remaining <1% of the trisaturated triglycerides, more of the desired LCPUFA, e.g., disaturated triglycerides containing one DHA molecule, would also crystallize out. This would cause significant losses of the target product, DHA. Losses could be an additional 8-10% of the lipids. So by trying to solve one problem, another was created. It would be desirable to have a process by which the LCPUFA level could be maintained at a desirably high level and the haze could be reduced or eliminated.

SUMMARY

The present invention includes a process for purifying a lipid composition having predominantly neutral lipid components wherein the composition contains at least one long chain polyunsaturated fatty acid (LCPUFA) and at least one other compound. The process includes contacting the lipid composition with a polar solvent and the solvent is selected such that the other compound is less soluble in the solvent than is the LCPUFA. For example, the polar solvent can be selected from acetone, isopropyl alcohol, methanol, ethanol, ethyl acetate and mixtures thereof. The process further includes maintaining the lipid composition at a temperature range effective to precipitate at least a portion of the other compound. For example, the temperature range can be from about −20° C. to about 50° C., from about −5° C. to about 20° C., from about −5° C. to about 5° C. or about 0° C. The process then includes removing at least a portion of the other compound from the lipid composition to form a lipid product. The process can be specifically for the reduction of the formation of haze in a lipid composition in which the compound being removed is a haze-forming compound.

In various embodiments, the lipid composition can include at least 50% or 85% neutral lipid, or at least 50% triglyceride. The concentration of LCPUFA, on a weight percentage basis, can be greater after the process than before, and the concentration of the other compound, on a weight percentage basis, can be less after the process than before. For example, the total concentration of any phosphorus-containing compounds present in the lipid, on a weight percentage basis, is less after the process than before. The process of the present invention can result in an acceptable product with less downstream processing required, such as with reduced degumming or no degumming required.

The LCPUFA can be arachidonic acid (ARA), omega-6 docosapentaenoic acid (DPA(n-6)), omega-3 docosapentaenoic acid (DPA(n-3)), eicosapentaenoic acid (EPA) and/or docosahexaenoic acid (DHA). The other compound can be trisaturated glycerides, phosphorus-containing materials, wax esters, saturated fatty acid containing sterol esters, sterols, squalene, and/or hydrocarbons. Alternatively, the other compound can be trisaturated glycerides, phosphatides and wax esters. Alternatively, the other compound can be trisaturated glycerides of lauric (C12:0), myristic (C14:0), palmitic (C16:0) and stearic (C18:0) fatty acids and/or mixtures thereof. In a particular embodiment, the lipid composition initially comprises at least one LCPUFA and at least one trisaturated glyceride. The LCPUFA can be obtained from a LCPUFA-containing biomaterial selected from LCPUFA-containing microbial biomass and oilseeds from plants that have been genetically modified to produce LCPUFA-containing lipid. Also, the LCPUFA can be obtained from plants that have been modified with LCPUFA-producing genes from microbes. In another embodiment, the LCPUFA can be obtained from a source selected from the group consisting of thraustochytrid biomass, dinoflagellate biomass, *Mortierella* biomass, and oilseeds from genetically modified plants containing genes from thraustochytrids, dinoflagellates or *Mortierella*. In a further embodiment, the LCPUFA is obtained from the group comprising *Schizochytrium, Thraustochytrium* or *Crypthecodinium cohnii* biomass or oilseeds from genetically modified plants containing genes from *Schizochytrium* or *Thraustochytrium*.

In various embodiments of the invention, the solvent:lipid composition ratio is from about 1:10 to about 20:1, from about 1:8 to about 10:1, from about 1:5 to about 5:1, from about 1:2 to about 2.5:1, or about 1:1. In other embodiments, the time of contact between the solvent and the lipid composition is from about 0.5 to about 12 hours, from about 2 to about 6 hours, or about 4 hours.

In another embodiment of the invention, lipid is extracted using the polar solvent at low temperatures such that triglyceride molecules containing the LCPUFA are selectively extracted and other compounds that are not soluble in the polar solvent are not extracted. In a further embodiment, the lipid composition is extracted from a biomass and cellular debris and precipitated other compounds are separated from a miscella comprising the LCPUFA and the polar solvent.

A further embodiment of the invention includes employing the polar solvent to recover lipid in an extraction process conducted at temperatures that solubilize substantially all triglyceride components; forming a miscella comprising a mixture of the lipid composition and the polar solvent; cooling the miscella to selectively precipitate the undesired compounds; and separating the precipitated other compounds from the miscella. In this embodiment, the lipid composition can be extracted from biomass and cellular debris and precipitated other compounds are separated from a miscella comprising the LCPUFA and the polar solvent.

Another embodiment of the invention includes employing the polar solvent to recover lipid from a biomass in an extraction process conducted at temperatures that solubilize substantially all triglyceride components, forming a miscella comprising a mixture of the lipid composition, the polar solvent and cellular debris. The process further includes separating the cellular debris from the miscella and cooling the miscella to selectively precipitate the undesired compounds. Finally, the precipitated other compounds are separated from the miscella.

A further embodiment of the invention includes employing a nonpolar solvent to recover lipid in an extraction process conducted at temperatures that solubilize substantially all triglyceride components, forming a miscella comprising a mixture of the lipid composition and the nonpolar solvent. The process further includes removing most of the nonpolar solvent from the miscella, adding a polar solvent to the miscella, and cooling the miscella to selectively precipitate the undesired compounds. Finally, the precipitated other compounds are separated from the miscella. A still further embodiment of the invention includes employing a nonpolar solvent to recover lipid in an extraction process conducted at temperatures that solubilize substantially all triglyceride components, forming a miscella comprising a mixture of the lipid composition and the nonpolar solvent and winterizing the miscella. Most of the nonpolar solvent is removed from the miscella, and a polar solvent is added to it. The miscella is cooled to selectively precipitate the undesired compounds which are separated from the miscella. When the nonpolar solvent is removed from the miscella, the residual nonpolar solvent after removal is from about 0 to about 4 weight percent or from about 1 to about 4 weight percent.

In the various embodiments of the invention using a nonpolar solvent, the nonpolar solvent can be hexane. In various embodiments of the invention employing a separating or removing step for the precipitated other compound, the step can be a liquid/solid separation technique, such as centrifugation, filtering or combinations thereof.

BRIEF DESCRIPTION OF THE DRAWINGS

FIG. 1 is a flow diagram of a prior extraction process.
FIG. 2 is a flow diagram of a prior refining, bleaching and deodorizing process.
FIG. 3 is a flow diagram of a DHA-rich lipid extraction process of the present invention using acetone in one step.
FIG. 4 is a flow diagram of a DHA-rich lipid extraction process of the present invention using acetone in two steps.
FIG. 5 is a flow diagram of a DHA-rich lipid hexane extraction process and acetone winterization process of the present invention.

DESCRIPTION OF THE INVENTION

In accordance with the present invention, processes are provided for preferentially reducing the level of undesired components in a lipid, while maintaining high levels of desired LCPUFAs. As used herein, LCPUFAs are fatty acids with 20 or more carbon atoms and two (preferably three) or more double bonds. The LCPUFAs can be in a variety of forms, such as phospholipids, free fatty acids and esters of fatty acids, including triglycerides of fatty acids. It will be appreciated that when referring to the desired LCPUFA, what is meant is the LCPUFA in the form that exists in the lipid, most typically a triglyceride, and to a lesser extent mono- and diglycerides. Preferably, the concentration of the desired LCPUFA, as measured on a weight percent basis, is higher in the resulting lipid product than it is in the starting lipid composition. The undesired components are preferably trisaturated glycerides, such as trisaturated glycerides of lauric (C12:0), myristic (C14:0), palmitic (C16:0) and stearic (C18:0) fatty acids and mixtures thereof. Examples of other undesired components, in addition to trisaturated glycerides, include phosphorus-containing compounds (e.g., phosphatides or phospholipids), wax esters, saturated fatty acid containing sterol esters, sterols, squalene, hydrocarbons and the like. Preferably, two or more of the undesired compounds are reduced in the resulting product as compared to the starting lipid, as measured on a weight percent basis. As used herein, amounts will generally be on a weight percent basis, unless indicated otherwise.

In a preferred embodiment of the present invention the resulting product is subject to less haze or cloudiness when compared to the starting lipid. As a result of the process of the present invention, subsequent processing steps such as refining, can be reduced or eliminated. For example, subsequent processing steps such as bleaching and/or deodorizing can help reduce or eliminate the refining (or degumming) step. An example of the refining, bleaching and deodorizing process is set forth in comparative Example 2. If the refining process is not eliminated, it can be reduced by reducing the amount of caustic employed. While not wishing to bound by any theory, it is believed that a primary cause of haze or cloudiness results from trisaturated triglycerides. It does not appear to be as important to reduce the mono- and di-substituted triglycerides.

As used herein the term "lipids" will refer generally to a variety of lipids, such as phospholipids; free fatty acids; esters of fatty acids, including triglycerides of fatty acids; sterols; pigments (e.g., carotenoids and oxycarotenoids) and other lipids, and lipid associated compounds such as phytosterols, ergothionine, lipoic acid and antioxidants including beta-carotene, tocotrienols, and tocopherol. Preferred lipids and lipid associated compounds include, but are not limited to, cholesterol, phytosterols, desmosterol, tocotrienols, tocopherols, ubiquinones, carotenoids and xanthophylls such as beta-carotene, lutein, lycopene, astaxanthin, zeaxanthin, canthaxanthin, and fatty acids such as conjugated linoleic acids, and omega-3 and omega-6 highly unsaturated fatty acids such as eicosapentaenoic acid, docosapentaenoic acid, and docosahexaenoic acid, arachidonic acid, stearidonic acid, dihomogammalinolenic acid and gamma-linolenic acid or mixtures thereof. For the sake of brevity, unless otherwise stated, the term "lipid" refers to lipid and/or lipid-associated compounds.

The undesirable components share the common characteristic of being relatively insoluble in cold acetone or in an analogous polar solvent. On the other hand, desired LCPUFAs, such as arachidonic acid (ARA), omega-6 docosapentaenoic acid (DPA(n-6)), omega-3 docosapentaenoic acid (DPA(n-3)), eicosapentaenoic acid (EPA) or docosahexaenoic acid (DHA), are soluble in cold acetone or in an analogous solvent. The key characteristic of the solvent, whether it is acetone or an analogous polar solvent, is that the desirable LCPUFAs are soluble in the solvent at the desired temperatures, and the undesirable compounds are not soluble in the solvent at the same temperatures. A useful guide is to select solvents that have dielectric constants close to those of acetone or ethyl acetate. Preferred solvents for use in connection with the present invention include acetone and analogous polar solvents such as isopropyl alcohol, methanol, ethanol, ethyl acetate or mixtures of these solvents. The solvents are all polar, and the LCPUFAs, with their double bonds and long carbon chains, are also polar and therefore soluble in the polar solvents. However, if the solvents are too polar, the LCPUFAs may not dissolve. The solvent is also preferably useful in food applications.

It was unexpectedly found that acetone can be used to selectively precipitate the trisaturated glycerides from the crude lipid. When an unwinterized lot of DHA-rich lipid from *Schizochytrium* sp. was treated with 5 volumes of acetone and chilled, essentially all of the trisaturated glycerides were removed by crystallization followed by centrifugation. This process removed little or none of the DHA-containing triglycerides. The resulting winterized lipid contained 41% DHA as compared to 37% by the standard winterization process.

There are ways to further utilize this discovery by combining acetone or analogous solvent extraction with "in-situ" winterization concepts to better improve the recovery efficiency of long chain polyunsaturated fatty acid containing triglycerides at the expense of trisaturated glycerides or from triglycerides containing two saturated fatty acids and one mono-unsaturated fatty acid. One advantage of the process of the present invention is that less of the desired LCPUFAs are lost. For example, in prior processes about 30% of the extracted lipid, which contained the desired LCPUFAs, was lost during winterization. In contrast, the embodiment of the process of the present invention (i.e., hexane extraction followed by acetone winterization) that is most directly comparable to the prior process results in the loss of only about 7% to about 10% of the starting extracted lipid as a result of the acetone winterization. As a result, in this embodiment of the present invention, about 40% or more reduction in yield loss is realized. This is a significant improvement over the prior process (hexane extraction and winterization plus full refining, bleaching and deodorizing (RBD)). The largest loss of both DHA and lipid is incurred in the winterization step of the prior process.

First, in a preferred process, lipid is extracted using acetone or analogous polar solvent (instead of hexane) at low temperatures such that triglyceride molecules containing LCPUFA are selectively extracted from *Schizochytrium* sp. biomass. A flow diagram of such a process is illustrated in FIG. 3. Due to the selectivity of acetone at low temperature (trisaturated glycerides are not soluble in cold acetone, while LCPUFA-containing triglycerides are soluble in cold acetone), it is feasible to selectively remove the LCPUFA-containing triglyceride from biomass and thus eliminate the need for a separate winterization step. The solvent extraction can be conducted in any suitable manner. For example, the dry biomass can be subjected to mechanical (e.g., in a mill or homogenizer) or chemical (e.g., using an acid, enzyme or base) lysing in the presence of a cold solvent. The cellular debris and precipitated trisaturated glycerides are separated from the miscella in one step. Post processing steps, such as purification by refining, bleaching and deodorizing, can be performed, if desired.

A second option is to utilize acetone or analogous polar solvent to quantitatively recover lipid from biomass in a conventional extraction process (including any type of solvent grinding technique). This extraction is conducted at temperatures that solubilize all triglyceride components. Prior to removing cellular debris from the miscella (lipid containing triglycerides in solvent), the miscella is chilled to selectively remove the trisaturated glycerides. The chilled miscella is then centrifuged, filtered, or separated using other techniques to remove both the cellular debris and trisaturated glyceride component. This option combines the concept of extraction and winterization into one step.

A third option is to utilize acetone or analogous polar solvent to quantitatively recover lipid from biomass in a conventional extraction process (including any type of solvent grinding technique). This extraction is conducted at temperatures that solubilize all triglyceride components. The cellular debris from the miscella (lipid containing triglycerides in solvent) is removed using conventional separation techniques. The miscella is then chilled to crystallize the trisaturated glycerides, which are removed by centrifugation, filtration, or separation using other techniques. This option utilizes extraction and winterization in two stages; however, acetone or an analogous polar solvent is utilized to accomplish both tasks. A flow diagram illustrating such a process is shown in FIG. 4.

A fourth option is to utilize a nonpolar solvent such as hexane (e.g., n-hexane, isohexane or a combination thereof) as an extraction solvent and utilize acetone as a winterization solvent. Preferably, at least 95%, more preferably at least 96%, more preferably at least 97%, more preferably at least 98% and more preferably at least 99% of the nonpolar solvent is removed prior to winterization. The winterization step can be employed at any stage prior to deodorization. A flow diagram illustrating such a process is shown in FIG. 5.

A fifth option is to utilize conventional hexane extraction and hexane-based winterization to remove the majority of the trisaturated glyceride component and employ a "polishing" step prior to deodorization to remove the small amounts of trisaturated glycerides contributing to the haze formation in the lipid. The polishing step employs acetone and/or an analogous solvent. This option removes the problems caused by haze, but the lipid level is also reduced.

Preferably, the lipid composition initially comprises at least one LCPUFA and at least one trisaturated glyceride. Preferably, the other or undesired compound results in the formation of haze when present in the initial concentration in the initial lipid composition. Preferably, the LCPUFA-containing biomaterial for lipid extraction is selected from the group including: LCPUFA-containing microbial biomass or oilseeds from plants that have been genetically modified to produce LCPUFA containing lipids, particularly plants that have been modified with the LCPUFA-producing genes from microbes (algae, fungi, protists, or bacteria). More preferably, the LCPUFA-containing biomaterial for lipid extraction is selected from the group including thraustochytrid biomass, dinoflagellate biomass and/or *Mortierella* biomass, and/or oilseeds from genetically modified plants containing genes from thraustochytrids, dinoflagellate and/or *Mortierella*. More preferably, the LCPUFA-containing biomaterial for lipid extraction is selected from the group including *Schizochytrium, Thraustochytrium* and/or *Crypthecodinium* (preferably, *Crypthecodinium cohnii*) biomass or oilseeds from genetically modified plants containing genes from *Schizochytrium* or *Thraustochytrium* and/or *Crypthecodinium* (preferably, *Crypthecodinium cohnii*).

Preferably, the initial lipid composition is predominantly made up of neutral lipids. Preferably, the initial lipid composition comprises at least 50% neutral lipids, preferably, at least 60% neutral lipids, preferably, at least 75% neutral lipids, preferably at least 85% neutral lipids and preferably at least 90% neutral lipids. Preferably, the neutral lipid predominantly comprises triglyceride. Preferably, the initial lipid composition comprises at least 50% triglyceride, preferably, at least 60% triglyceride, preferably, at least 75% triglyceride and preferably at least 85% triglyceride. The foregoing percentages in this paragraph refer to weight percentages. Preferably, the concentration of the desired LCPUFA is greater in the resulting product than in the initial lipid composition.

Preferred polar solvent:lipid ratios, based on weight, for the extraction or winterization process are from about 1:10 to about 20:1; more preferably from about 1:8 to about 10:1, preferably from about 1:5 to about 5:1, and preferably from about 1:2 to about 2.5:1. Preferably the contact time between the polar solvent and lipid is from about 0.5 to about 12 hours, preferably from about 2 to about 6 hours, and preferably about 4 hours. Preferably, if a nonpolar lipid is used, the residual nonpolar lipid is from about 0 to about 4 weight percent, and preferably from about 1 to about 4 weight percent.

Preferably the temperature for the: (i) cold extraction process, (ii) extraction followed by chilling and filtration/centrifugation, (iii) extraction, filtration/centrifugation of cellular debris, followed by chilling and filtration/centrifugation; and (iv) chilling conditions for solvent winterization or polishing steps is from the solidification point of the lipid to the melting point of the undesirable component (e.g. trisaturated glycerides), more preferably from about −20° C. to about 50° C., more preferably from about −5° C. to about 20° C., more preferably from about −5° C. to about 5° C., more preferably about 0° C.

Other preferred attributes of the process include the selective recovery of only LCPUFA-containing triglycerides at the expense of trisaturated glycerides and other components that are relatively insoluble in cold acetone including phosphatides, wax esters, saturated fatty acid containing sterol esters, sterols, squalene, hydrocarbons and the like. By selectively recovering only the LCPUFA-containing triglyceride at the expense of these undesirable components allow the possibility of eliminating or reducing additional downstream purification steps (such as winterization, refining, and bleaching).

EXAMPLE 1

Summary

A sample of DHA-rich lipid obtained from *Schizochytrium* (Sample 1, unwinterized lipid, a.k.a. "high melt") and an isolated sediment from another DHA-rich lipid obtained from *Schizochytrium* (Sample 2) were analyzed to determine the nature of the solid phase (Sample 1) and the floc/sediment (Sample 2).

Unwinterized lipid Sample 1 produced at plant scale (a semi-solid at ambient temperature) was dissolved in 4 volumes of cold acetone and mixed. A solid white powder (approximately 7% by weight) was isolated by filtration through a glass fiber filter. The solid white powder had a melting temperature of 52.4-53.5° C., was shown to be triglycerides (based on a single spot by thin layer chromatography (TLC)), and contained predominantly myristic (26%) and palmitic acids (66%) when analyzed by GLC. This high melting triglyceride fraction contains saturated fatty acids with very little DHA/DPA. The isolated lipid fraction (91% by weight) was an orange-colored liquid at room temperature and contained 41.0% DHA and 16.0% DPA. DHA and DPA were enriched by approximately 8% compared to the starting fatty acid profile of Sample 1—this is a true "purification" of DHA and DPA.

Another DHA-rich reprocessed lipid from *Schizochytrium* contained an obvious floc-like material (haze) when stored for a period of days at ambient temperature. The floc was isolated by centrifugation. The floc/sediment ("Sample 2 sediment") was dissolved in 10 volumes of cold acetone, mixed and filtered. Approximately 15% by weight of a solid white powder was isolated by filtration through a glass fiber filter. The solid white powder had a melting temperature of 50.1-51.4° C. and was shown to be triglycerides (based on single spot by TLC) containing predominantly myristic (29%) and palmitic acids (59%). This is a high melting triglyceride fraction containing saturated fatty acids with little DHA/DPA. The isolated lipid fraction (85% by weight) was a clear, orange-colored liquid at room temperature and contained 41.1% DHA and 16.3% DPA. The floc formation in reprocessed lipid from Schizochytrium is believed to result from a high melting triglyceride, containing myristic and palmitic fatty acids, which crystallizes from lipid upon standing.

Experimental

General—A sample of DHA-rich lipid from Sample 1 (250 g bottle) was pulled from frozen storage. This is a sample of unwinterized lipid. The sample was allowed to warm to ambient temperature and used as is.

Sediment (Sample 2) was isolated from DHA-rich lipid using a lab centrifuge. The DHA-rich lipid was a reprocessed lot of lipid that contained a visible floc when left to stand at ambient temperature. The floc was isolated by centrifuging the sample and decanting the liquid fraction from the sediment. The liquid fraction remained clear at ambient temperature; therefore the floc was believed to be present in the isolated sediment.

Acetone Winterization—Unwinterized lipid (Sample 1) and sediment isolated from reprocessed lipid (Sample 2) were fractionated using an acetone winterization procedure. The sediment and unwinterized sample were dissolved in excess cold acetone (ice/water bath temperature) and mixed to dissolve and suspend lipid components. The solution/suspension was immediately filtered through a glass fiber filter under vacuum. The filter paper and the contents remaining on the paper were washed with small amounts of cold acetone. The contents of the filter paper were air dried and weighed. The lipid/acetone fraction was concentrated under vacuum to afford neat lipid and weighed.

TLC—TLC was performed to determine lipid class composition using silica gel 60 plates. The developing solvent system consisted of a 90:10:1 mixture of petroleum ether: ethyl ether: acetic acid. The $R_f$ of the spots were compared to those listed in "Techniques in Lipidology" by Morris Kates.

Melting point determination—Melting points were determined using a lab constructed melting point apparatus.

Infrared spectrometry—Infrared spectra were obtained using a Perkin Elmer 283B Infrared Spectrometer. Liquid fractions were analyzed neat. Solid fractions from acetone winterization were analyzed in chloroform.

Fatty Acid Methyl Esters (FAMEs)—Aliquots of DHA-rich lipid Sample 1, Sample 2 (reprocessed) along with acetone winterization fractions were transesterified using anhydrous HCl in methanol following procedures for determining the free fatty acid profile, from C12 to C22:6. All FAME preparation and GLC work were completed. FAME's were identified and quantified using NuChek Prep analytical reference standard 502 using an internal standard (C19:0) to determine empirical response factors.

Gas-liquid chromatography—Gas-liquid chromatography of methyl esters was performed using a Hewlett-Packard Model 6890 Series II gas-liquid chromatograph equipped with a Hewlett-Packard autosampler, ChemStation software, a 30 m×0.32 mm SP-2380 capillary column (Supelco), and a flame-ionization detector. The oven temperature was held at 120° C. for 3 min, programmed to 190° C. at 5° C./min, held at 190° C. for 1 min, programmed to 260° C. at 20° C./min, and then held for 3 minutes at 260° C. The injector temperature was set at 295° C. and the detector temperature was set at 280° C. Helium was used as a carrier gas and a split injection technique was employed.

Results

DHA-Rich Lipid Sample 1

A sample of unwinterized DHA-rich lipid (250 g bottle) was pulled from frozen storage, Sample 1. This sample remained semi-solid at ambient temperature and can be technically referred to as a "fat", not an "oil". An aliquot (14.44 g) of the fat was transferred to an Erlenmeyer flask and 60 ml of cold acetone (ice/water bath) was added. The flask was swirled to dissolve/suspend the fat components and immediately filtered through a glass fiber filter under vacuum. A solid white fraction remained on the filter paper and was washed with a few milliliters of cold acetone and dried. The solid white fraction was isolated in a 6.3% yield (0.91 g starting from 14.44 g fat).

The lipid/acetone fraction resulting from filtration was concentrated by rotary evaporation to afford 13.13 g of an orange-colored liquid material (liquid at ambient temperature). This resulted in a 91% overall recovery; therefore approximately 2% of material was lost at bench scale.

The solid white fraction and the lipid fraction isolated after "acetone winterization" were analyzed by TLC to determine lipid composition. The solid white fraction was shown to be triglycerides based on TLC (one spot with an $R_f$ corresponding to a triglyceride was observed). Many spots were observed by TLC upon spotting and developing the lipid fraction. The $R_f$ of the spots was consistent with lipid components comprising squalene, steryl esters, triglycerides, and sterols (all tentative assignments). No further analysis of lipid class composition was performed.

The solid white fraction isolated after acetone winterization had a melting point range of 52.4-53.5° C.

The solid and liquid fraction isolated after acetone winterization were transesterified to methyl esters and the methyl esters were analyzed by gas-liquid chromatography. The complete profile of FAME's for both the solid and liquid fraction isolated by acetone winterization along with unwinterized DHA-rich fat (Sample 1) is shown in Table 1. As is evident, the solid fraction contained very little DHA (2.4%) and DPA (0.9%) with methyl myristate (26%) and methyl palmitate (66%) as the predominant fatty acids. The liquid fraction isolated after acetone winterization contained myristate (8.3%), palmitate (23.1%), DPA (16.0%), DHA (41.0%) along with other minor fatty acids. When this profile is compared to that of the starting unwinterized lipid, an enrichment of the DHA of approximately 8% is seen, consistent with the removal of the predominantly trisaturated glyceride component. This represents a purification step.

DHA-Rich Lipid Sediment (Sample 2)

The sediment that was produced from re-refined lipid was completely miscible in hexane and not miscible in methanol. When small quantities of acetone were added to the sediment, a white precipitate formed which separated from the liquid, yellow-colored lipid/acetone phase. Based on these dissolution tests, acetone fractionation was used to isolate the white powder.

An aliquot (1.11 g) of sediment was transferred to an Erlenmeyer flask and 10 ml of cold acetone (ice/water bath) was added. The flask was swirled to dissolve/suspend the fat components and immediately filtered through a glass fiber filter under vacuum. A solid white fraction remained on the filter paper and was washed with a few milliliters of cold acetone and dried. The solid white fraction was isolated in a 15% yield (0.17 g starting from 1.11 g sediment).

The lipid/acetone fraction resulting from filtration was concentrated by rotary evaporation to afford 0.94 g of an orange-colored liquid material (liquid at ambient temperature). This resulted in an 85% overall recovery.

The solid white fraction and the lipid fraction isolated after acetone fractionation were analyzed by TLC to determine lipid composition. The solid white fraction was shown to be triglycerides based on TLC (one spot with an $R_f$ corresponding to a triglyceride was observed). Many spots were observed by TLC upon spotting and developing the lipid fraction. The $R_f$ of the spots was consistent with lipid components comprising squalene, steryl esters, triglycerides, and sterols (all tentative assignments). No further analysis of lipid class composition was performed.

The solid white fraction isolated after acetone winterization had a melting point range of 50.1-51.4° C.

The solid and liquid fraction isolated after acetone winterization were transesterified to methyl esters and the methyl esters were analyzed by gas-liquid chromatography. The complete profile of FAME's for both the solid and liquid fraction isolated by acetone winterization along with Sample 2 sediment is shown in Table 1. As is evident, the solid fraction contains very little DHA (6.4%) and DPA (2.6%) with methyl myristate (29%) and methyl palmitate (59%) as the predominant fatty acids. The liquid fraction isolated after acetone winterization contains myristate (8.4%), palmitate (23.2%), DPA (16.3%), DHA (41.1%) along with other minor fatty acids.

TABLE 1

Fatty acid profile of unwinterized oil (Sample 1), Sample 2 sediment and fractions isolated from Sample 1 and Sample 2 sediment by acetone fractionation

| FA Name | Unwinterized Sample 1 | Isolated Solid Fraction | Isolated Liquid Fraction Sample 1 | Sample 2 Sediment | Isolated Solid Fraction Sample 2 Sediment | Isolated Liquid Fraction Lot 21A Sediment |
|---|---|---|---|---|---|---|
| 14:0 | 9.6 | 25.9 | 8.3 | 12.2 | 27.0 | 8.4 |
| 16:0 | 25.9 | 66.0 | 23.1 | 30.5 | 58.8 | 23.2 |
| 16:1 | 0.3 | <0.1 | 0.3 | 0.3 | 0.2 | 0.3 |
| 18:0 | 0.7 | 1.8 | 0.6 | 0.7 | 1.5 | 0.6 |
| 18:4 n3 | 0.4 | <0.1 | 0.4 | 0.3 | <0.1 | 0.4 |
| 20:3 n6 | 0.4 | 0.2 | 0.4 | 0.3 | 0.2 | 0.5 |
| 20:4 n7 | 2.8 | <0.1 | 2.6 | 1.8 | <0.1 | 2.4 |
| 20:4 n6 | 0.9 | <0.1 | 1.0 | 0.8 | 0.1 | 1.0 |
| 20:4 n3 | 0.8 | <0.1 | 0.9 | 0.8 | <0.1 | 0.9 |
| 20:5 n3 | 2.2 | <0.1 | 2.3 | 1.9 | 0.3 | 2.3 |
| 22:4 n9 | 0.2 | <0.1 | 0.1 | 0.2 | <0.1 | 0.2 |
| 22:5 n6 | 14.7 | 0.9 | 16.0 | 13.6 | 2.6 | 16.3 |
| 22:6 n3 | 37.7 | 2.4 | 41.0 | 34.2 | 6.4 | 41.1 |

COMPARATIVE EXAMPLE

Table 2, set forth below, represents a comparative prior method as shown in Comparative FIG. 1 followed by Comparative FIG. 2.

TABLE 2

Certificate of Analysis
(*Schizochytrium* Biomass)
Refined, Deodorized, Bleached (RDB) Winterized
*Schizochytrium* oil after antioxidants addition

| | Specification | Result | Method Reference |
|---|---|---|---|
| Peroxide Value, meq/kg | Maximum 3.0 | 0.42 | AOCS Cd 8-53 |
| Free Fatty Acids, % | Maximum 0.25 | 0.06 | AOCS Ca 5a-40 |

TABLE 2-continued

Certificate of Analysis
(*Schizochytrium* Biomass)
Refined, Deodorized, Bleached (RDB) Winterized
*Schizochytrium* oil after antioxidants addition

| | | | |
|---|---|---|---|
| Moisture and volatiles, % | Maximum 0.05 | 0.03 | AOCS Ca 2d-25 |
| Trace Metals, ppm | | | POS AS.SOP-103 |
| Lead | Maximum 0.20 | <0.20 | |
| Arsenic | Maximum 0.20 | <0.20 | |
| Iron | Maximum 0.20 | 0.04 | |
| Copper | Maximum 0.05 | <0.05 | |
| Mercury | Maximum 0.20 | <0.20 | |
| DHA, % of FAME, wt/wt | Minimum 32.0 | 43.5 | POS AS.SOP-104 |
| DHA, mg/g of oil | Minimum 300 | 397.3 | POS AS.SOP-104 |
| Residual Hexane, ppm | Maximum 10 | <1.0 | AOCS Ca 3b-87 |

| | Specification | Value | Method Reference |
|---|---|---|---|
| Neutral oil, % | N/A | 99.69 | |
| p-Anisidine Value | N/A | 0.74 | AOCS Cd 18-90 |
| Colour, 1.0" Lovibond (PFX 990 AOCS) | N/A | 70.0Y 7.1R | AutoTintometer Colour |
| Colour, Gardner Scale, (1 cm) | N/A | 12.3 | |
| β- Carotene (PFX990), ppm, (0.01 cm) Note: not true β-Carotene | N/A | 276.41 | |

TABLE 2-continued

Certificate of Analysis
(*Schizochytrium* Biomass)
Refined, Deodorized, Bleached (RDB) Winterized
*Schizochytrium* oil after antioxidants addition

| | | | |
|---|---|---|---|
| Unsaponifiables, % | N/A | 2.24 | AOCS Ca 6b-53 |
| Insoluble Impurities, % | N/A | 0.01 | AOCS Ca 3-46 |
| AOM, hr | N/A | 7.66 | AOCS Cd 12-57 |
| Rancimat (80° C.), Hr | N/A | 22.7 | |
| Spin test, % solids by volume, 20° C./24 hrs after antiox addition | N/A | ~0.2* | |
| Spin test, % solids by Vol, before antiox addition | N/A | zero | |
| Fatty Acid Composition (absolute), mg/g | N/A | | POS AS.SOP-104 |

TABLE 2-continued

Certificate of Analysis
(*Schizochytrium* Biomass)
Refined, Deodorized, Bleached (RDB) Winterized
*Schizochytrium* oil after antioxidants addition

| | |
|---|---|
| C12 | 2.6 |
| C14 | 69.4 |
| C14:1 | 0.8 |
| C15 | 3.1 |
| C16 | 187.8 |
| C16:1 | 4.4 |
| C18 | 4.6 |
| C18:1 | 7.2 |
| C18:2 | 3.6 |
| C18:3n6 | 2.3 |
| C18:4 | 3.0 |
| C20 | 1.2 |
| C20:4n6 | 7.4 |
| C20:4n3 AA | 8.5 |
| C20:5n3 EPA | 18.2 |
| C22 | 0.6 |
| C22:5n6† DPA | 151.6 |
| C22:6n3 DHA | 397.3 |
| C24 | 1.8 |
| C24:1 | 1.9 |
| Others | 35.1 |
| Total, mg/g | 912.4 |
| DHA, % of FAME | 43.5 |
| Ascorbyl palmitate, ppm | 224 |
| Tocopherols, ppm | 1,760 |

*ppte from Addition of Rosemary extract.

Table 3, set forth below, represents a process of the present invention, as set forth in FIG. 5 followed by the bleaching, deodorizing and refining of Comparative FIG. 2.

TABLE 3

Acetone Winterized *Schizo* oil
RDB *Schizo* oil after antioxidants addition
(From *Schizochytrium* biomass)

| | Specification | Result | Method Reference |
|---|---|---|---|
| Peroxide Value, meq/kg | Maximum 3.0 | 1.32 | AOCS Cd 8-53 |
| Free Fatty Acids, % | Maximum 0.25 | 0.06 | AOCS Ca 5a-40 |
| Moisture and volatiles, % | Maximum 0.05 | 0.03 | AOCS Ca 2d-25 |
| Trace Metals, ppm | | | POS AS.SOP-103 |
| Lead | Maximum 0.20 | <0.20 | |
| Arsenic | Maximum 0.20 | <0.20 | |
| Iron | Maximum 0.20 | 0.11 | |
| Copper | Maximum 0.05 | <0.05 | |
| Mercury | Maximum 0.20 | <0.20 | |
| DHA, % of FAME | Minimum 32.0 | 42.8 | POS AS.SOP-104 |
| DHA, mg/g of oil | Minimum 300 | 385.5 | POS AS.SOP-104 |
| Residual Hexane, ppm | Maximum 10 | <1.0 | AOCS Ca 3b-87 |

| | Specification | Value | Method Reference |
|---|---|---|---|
| Neutral oil, % | N/A | 99.69 | |
| p-Anisidine Value | N/A | 1.08 | AOCS Cd 18-90 |
| Colour, 1.0" Lovibond (PFX 990 AOCS) | N/A | 70.0Y 6.3R | AutoTintometer Colour |
| Colour, Gardner Scale, (1 cm) | N/A | 12.0 | |
| β- Carotene (PFX990), ppm, (0.01 cm) Note: not true β-Carotene | N/A | 228.0 | |

TABLE 3-continued

Acetone Winterized *Schizo* oil
RDB *Schizo* oil after antioxidants addition
(From *Schizochytrium* biomass)

| | | | |
|---|---|---|---|
| Unsaponifiables, % | N/A | 2.11 | AOCS Ca 6b-53 |
| Insoluble Impurities, % | N/A | 0.01 | AOCS Ca 3-46 |
| AOM, hr | N/A | 7.00 | AOCS Cd 12-57 |
| Rancimat (80° C.), Hr | N/A | 19.9 | |
| Spin test, % solids by volume, 20° C./24 hrs | N/A | ≈0.2 | |
| Fatty Acid Composition (absolute), mg/g | N/A | | POS AS.SOP-104 |
| C12 | | 3.9 | |
| C14 | | 90.1 | |
| C14:1 | | 0.8 | |
| C15 | | 3.4 | |
| C16 | | 193.9 | |
| C16:1 | | 6.5 | |
| C18 | | 4.8 | |
| C18:1 | | 8.1 | |
| C18:2 | | 3.6 | |
| C18:3n6 | | 1.7 | |
| C18:4 | | 2.6 | |
| C20 | | 1.5 | |
| C20:4n6 | | 4.9 | |
| C20:4n3 AA | | 7.7 | |
| C20:5n3 EPA | | 12.5 | |
| C22 | | 0.8 | |
| C22:5n6† DPA | | 129.7 | |
| C22:6n3 DHA | | 385.5 | |
| C24 | | 1.9 | |
| C24:1 | | 1.6 | |
| Others | | 34.5 | |
| Total, mg/g | | 900.0 | |
| DHA, % of FAME | | 42.8 | |
| Ascorbyl palmitate, ppm | | 222 | |
| Tocopherols, ppm | | 1940 | |

EXAMPLE 3

A crude extract of *Schizochytrium* oil was subjected to a variety of winterization procedures in which a lipid composition was extracted from biomass with hexane. The hexane was removed to produce a crude extracted oil having a residual amount of hexane. The extracted oil was then extracted with acetone at a particular acetone/oil ratio and winterized at a particular temperature for a given amount of time. The % residual hexane, acetone/oil ratio, winterization temperature and winterization time were varied in different experiments. The processes were evaluated in terms of filtration time, oil recovery and haziness after two weeks. The details of the experiments and the results are shown below in Table 4.

TABLE 4

The levels of tested variables and observations of acetone-winterized Schizochytrium oil

| Experiment No. | Hexane % | Acetone/ Oil Ratio | Winter- ization Temp. (C.) | Winter- ization Time (H) | Filtration @ (sec) | Oil Recovery (%) | Haziness After 2 weeks |
|---|---|---|---|---|---|---|---|
| 1 | 1 | 1.5 | 5 | 3 | 67 | 87.8 | Clear |
| 2 | 2 | 1 | 0 | 2 | 165 | 86.4 | PPT |
| 3 | 2 | 1 | 0 | 4 | 195 | 87.7 | Clear |
| 4 | 2 | 1 | 10 | 2 | 178 | 88.1 | PPT |
| 5 | 2 | 1 | 10 | 4 | 154 | 89.8 | PPT |
| 6 | 2 | 2 | 0 | 2 | 85 | 84.1 | PPT |
| 7 | 2 | 2 | 0 | 4 | 75 | 86.2 | Clear |
| 8 | 2 | 2 | 10 | 2 | 67 | 88.9 | PPT |
| 9 | 2 | 2 | 10 | 4 | 82 | 86.7 | PPT |
| 10 | 3 | 0.5 | 5 | 3 | 264 | 84.3 | PPT |
| 11 | 3 | 1.5 | −5 | 3 | 102 | 83.4 | Clear |
| 12 | 3 | 1.5 | 5 | 1 | 87 | 85.5 | PPT |
| 13 | 3 | 1.5 | 5 | 3 | 109 | 85.4 | Clear |
| 14 | 3 | 1.5 | 5 | 3 | 123 | 86.3 | Clear |
| 15 | 3 | 1.5 | 5 | 3 | 82 | 87.5 | Clear |
| 16 | 3 | 1.5 | 5 | 3 | 110 | 87.9 | Clear |
| 17 | 3 | 1.5 | 5 | 5 | 117 | 86.6 | PPT |
| 18 | 3 | 1.5 | 15 | 3 | 255 | 94.8 | PPT |
| 19 | 3 | 2.5 | 5 | 3 | 73 | 87.2 | PPT |
| 20 | 4 | 1 | 0 | 2 | 262 | 87.5 | Clear |
| 21 | 4 | 1 | 0 | 4 | 115 | 91.2 | PPT |
| 22 | 4 | 1 | 10 | 2 | 245 | 83.7 | PPT |
| 23 | 4 | 1 | 10 | 4 | 375 | 86.7 | PPT |
| 24 | 4 | 2 | 0 | 2 | 52 | 88.4 | PPT |
| 25 | 4 | 2 | 0 | 4 | 80 | 89.3 | PPT |
| 26 | 4 | 2 | 10 | 2 | 92 | 86.8 | PPT |
| 27 | 4 | 2 | 10 | 4 | 83 | 88.7 | PPT |
| 28 | 5 | 1.5 | 5 | 3 | 86 | 87.1 | PPT |
| Control | | | | | 150 | 90.9 | PPT* |

Control: Hexane winterization (45:55, Oil:Hexane) at −3 C. for 5 h
PPT - Precipitate observed after spin-test
*The hexane winterized sample showed PPT after filtration (the same day), an indication of incomplete crystallization. The recovery obtained in the lab would not be duplicated in the plant as the thorough drying of the cake may not be achievable with the enclosed filters.
Typical recovery in plant is around 70-75%.

TABLE 5

The oil recovery, filtration time and analytical data of crude oil, hexane and acetone-winterized oils.

| Observations/ analysis | Crude oil | Plant- Hexane winterized oil | Lab- Hexane- winterized oil | Acetone- winterized oil (Verification trail-1) | Acetone- winterized oil (Verification trail-2) |
|---|---|---|---|---|---|
| Oil recovery (%) | | 70% | 90.9 | 86.9 | 85.3 |
| Filtration @ (Sec) | | — | 150 | 158 | 114 |
| Color (1″ cell) | Too dark | — | 70Y | Too dark | Too dark |
| (1 cm cell) | 70Y 11.2R | | 12.3R | 70Y 12R | 70Y 11.1R |
| Phosphorus (ppm) | 474.3 | — | 474.0 | 271.6 | 144.3 |
| Free fatty acids | 0.53 | — | 0.49 | 0.52 | 0.43 |
| PV (meq/kg) | 0.00 | — | 1.82 | 3.32 | 4.27 |
| Anisidine value | 4.11 | — | 4.37 | 3.73 | 3.66 |
| Fatty acid comp. (mg/g) | | | | | |
| C12:0 | 2.3 | — | 2.1 | 2.2 | 2.1 |
| C14:0 | 67.2 | — | 57.8 | 58.5 | 58.9 |
| C14:1 | 0.7 | — | 0.7 | 0.8 | 0.8 |
| C15:0 | 3.3 | — | 3.1 | 3.1 | 3.2 |
| C16:0 | 204.9 | — | 185.2 | 187.0 | 188.1 |
| C16:1 | 3.3 | — | 3.5 | 3.6 | 3.5 |
| C18:0 | 5.1 | — | 4.5 | 4.5 | 4.7 |
| C18:1 | 3.9 | — | 4.0 | 4.0 | 4.0 |
| C18:2 | 2.6 | — | 2.7 | 2.7 | 2.7 |
| C18:3n6 | 2.3 | — | 2.5 | 2.5 | 2.6 |
| C18:4 | 3.3 | — | 3.5 | 3.6 | 3.6 |
| C20:0 | 1.2 | — | 1.0 | 1.0 | 1.0 |
| C20:4n6 | 9.4 | — | 9.7 | 10.2 | 10.3 |
| C20:4n3 | 8.0 | — | 8.3 | 8.5 | 8.6 |
| C20:5n3 | 23.6 | — | 24.9 | 25.4 | 25.6 |
| C22:0 | 0.6 | — | 0.6 | 0.5 | 0.6 |

TABLE 5-continued

The oil recovery, filtration time and analytical data of crude oil, hexane and acetone-winterized oils.

| Observations/analysis | Crude oil | Plant-Hexane winterized oil | Lab-Hexane-winterized oil | Acetone-winterized oil (Verification trail-1) | Acetone-winterized oil (Verification trail-2) |
|---|---|---|---|---|---|
| C22:5n6 | 142.9 | — | 149.6 | 152.7 | 154.0 |
| C22:6n3 | 351.1 | 369.0* | 369.0 | 378.6 | 382.2 |
| C24:0 | 1.9 | — | 1.6 | 1.6 | 1.6 |
| C24:1 | 4.0 | — | 4.1 | 4.3 | 4.2 |
| Others | 35.2 | — | 37.5 | 37.9 | 38.4 |
| Recovery of DHA | | 73% | 95.6% | 93.8% | 92.8% |

*The estimation of DHA recovery of Pilot Plant hexane -winterized oil is based on the past data of *Schizo* oil process

TABLE 6

The fatty acid composition of acetone-winterized wax.

| Observations/Analysis | Acetone-winterized wax (Verification trail-1) | Acetone-winterized wax (Verification trail-2) |
|---|---|---|
| Wax recovery (%) | 13.1 | 14.7 |
| Fatty acid comp. (mg/g) | | |
| C12:0 | 2.8 | 2.6 |
| C14:0 | 112.4 | 103.2 |
| C14:1 | 0.4 | 0.4 |
| C15:0 | 3.8 | 0.6 |
| C16:0 | 303.4 | 282.6 |
| C16:1 | 2.1 | 2.1 |
| C18:0 | 8.6 | 8.7 |
| C18:1 | 3.3 | 3.6 |
| C18:2 | 1.3 | 1.7 |
| C18:3n6 | 1.1 | 1.0 |
| C18:4 | 1.5 | 1.4 |
| C20:0 | 2.2 | 2.0 |
| C20:4n6 | 4.9 | 4.6 |
| C20:4n3 | 4.1 | 4.0 |
| C20:5n3 | 11.9 | 11.9 |
| C22:0 | 1.3 | 1.2 |
| C22:5n6 | 76.8 | 75.7 |
| C22:6n3 | 175.2 | 170.5 |
| C24:0 | 3.8 | 3.5 |
| C24:1 | 2.1 | 2.0 |
| Others | 16.6 | 18.1 |

CONCLUSIONS

Based on an analysis of the Sample 2 sediment, it is believed the floc is triglycerides containing predominantly myristic and palmitic acids. This is based on TLC, IR, and resulting FAME analysis by GLC. The triglycerides comprising the floc had a high melting temperature (50.1-51.4° C.).

The high melting temperature of the isolated white powder, coupled with the triglyceride lipid class composition of this fraction, indicates that the winterization step employed during standard processing is not quantitatively removing "high melting" fractions from the lipid. Therefore, an additional "polishing" step is recommended to achieve clarity in the finished goods product.

To estimate the solid contribution of unwinterized lipid in Sample 1, an acetone winterization procedure was employed. A solid white fraction isolated from Sample 1 in 6-7% yield was shown to be triglycerides containing predominantly myristic and palmitic acids (>94% of the fatty acids in this triglyceride component were saturated fats). Palmitic and myristic acid are present in roughly a 2:1 ratio and, coupled with the narrow range in melting temperature, suggest a defined structure to this triglyceride. Very little DPA and DHA were present in the solid triglyceride fraction. The isolated liquid fraction following acetone winterization contained 41.0% DHA (expressed as a percentage of total fatty acid methyl esters) compared to 37.7% DHA in the starting unwinterized lipid. This is an approximate 8% enrichment of DHA, consistent with the removal of 7% trisaturated fatty acid glycerides.

Very little loss of DHA was shown in the bench scale acetone winterization process, indicating near quantitative recovery of DHA can be obtained during winterization.

Solid or solvent assisted winterization (acetone winterization demonstrated herein, however other solvent alternatives exist) offer the following possibilities and can be considered as processing options.

(1) A true removal of high melting, solid material can be accomplished.
(2) The solid material is mainly trisaturated fatty acid glyceride (>94% saturated fatty acids) with very little DHA (2.4%).
(3) As an example calculation, starting from 1,000 kg's of DHA in crude lipid, an approximate loss of 2 kg's of DHA would be encountered during acetone winterization (1,000×0.07×0.024). This is approximately a 0.2% recovery loss of DHA on an absolute weight basis.
(4) A clear liquid remains following winterization, with enrichment of DHA compared to the starting unwinterized lipid fatty acid profile.
(5) Solvent assisted winterization can be used to achieve DHA purification.
(6) Because of the high melting temperature of the trisaturated fatty acid glyceride component (>50° C.), traditional low temperature chilling conditions may not be required.

This application incorporates by reference U.S. Provisional Patent Application No. 60/341,180, filed on Dec. 12, 2001.

While various embodiments of the present invention have been described in detail, it is apparent that modifications and adaptations of those embodiments will occur to those skilled in the art. It is to be expressly understood, however, that such modifications and adaptations are within the scope of the present invention, as set forth in the following claims.

What is claimed is:

1. A process for recovering a lipid composition comprising predominantly neutral lipid from a biomass, wherein the biomass comprises cellular debris and at least one long chain polyunsaturated fatty acid (LCPUFA), comprising 20 or more carbon atoms the process comprising:

(a) contacting the biomass with a nonpolar solvent to recover a lipid composition in an extraction process;
(b) adding a polar solvent to the lipid composition;
(c) cooling the polar solvent and the lipid composition to selectively precipitate at least one other compound; and
(d) separating the precipitated other compound from the lipid composition resulting in a lipid composition with an increased weight percentage of LCPUFA.

2. The process of claim 1, further comprising processing the lipid composition by two or more processes selected from the group consisting of refining the lipid composition, bleaching the lipid composition, and deodorizing the lipid composition.

3. The process of claim 2, wherein processing the lipid composition comprises refining the lipid composition, bleaching the lipid composition and deodorizing the lipid composition.

4. The process of claim 2, wherein processing the lipid composition is conducted after the cooling of the polar solvent and lipid composition.

5. The process of claim 2, wherein the at least one other compound results in the formation of haze when present after the processing of the lipid composition.

6. The process of claim 1, wherein the polar solvent and the lipid composition in (b) are kept in contact for about 0.5 to about 12 hours.

7. The process of claim 1, wherein the polar solvent and the lipid composition in (b) are kept in contact for about 2 to about 6 hours.

8. The process of claim 1, wherein the polar solvent and the lipid composition in (b) are kept in contact for about 4 hours.

9. The process of claim 1, wherein a process for separating the precipitated other compound from the lipid composition in (d) is selected from the group consisting of centrifugation, filtering and a combination thereof.

10. The process of claim 1, wherein the separating of the precipitated other compound from the lipid composition is performed by filtering.

11. The process of claim 1, wherein the cooling of the polar solvent and the lipid composition to selectively precipitate the at least one other compound occurs at a temperature that the at least one LCPUFA is soluble in the polar solvent, and the at least one other compound is not soluble in the polar solvent.

12. The process of claim 1, wherein the LCPUFA is obtained from a source from the group consisting of *Schizochytrium* biomass, *Thraustochytrium* biomass and *Crypthecodinium cohnii* biomass and oilseeds from genetically modified plants containing genes from *Schizochytrium* or *Thraustochytrium*.

13. The process of claim 1, wherein the LCPUFA is docosahexaenoic acid (DHA).

14. The process of claim 1, wherein the at least one other compound comprises at least one compound selected from the group consisting of trisaturated glycerides, phosphorus-containing materials, wax esters, saturated fatty acid containing sterol esters, sterols, squalene, and hydrocarbons.

15. The process of claim 1, wherein the at least one other compound comprises at least one glyceride selected from the group consisting trisaturated glycerides of lauric (C12:0), myristic (C14:0), palmitic (C16:0), stearic (C18:0) fatty acids, and mixtures thereof.

16. The process of claim 1, wherein the nonpolar solvent is hexane.

17. The process of claim 1, further comprises removing the nonpolar solvent from the lipid composition.

18. The process of claim 17, wherein the nonpolar solvent after removing the nonpolar solvent from the lipid composition is up to about 4 weight percent of the lipid composition.

19. The process of claim 17, wherein the nonpolar solvent after removing the nonpolar solvent from the lipid composition is about 1 to about 4 weight percent of the lipid composition.

20. The process of claim 1, wherein the polar solvent is acetone.

21. The process of claim 1, wherein the lipid composition comprises at least 60% neutral lipid by weight.

22. The process of claim 1, wherein the lipid composition comprises at least 75% neutral lipid by weight.

23. The process of claim 1, wherein the lipid composition comprises at least 85% neutral lipid by weight.

24. The process of claim 1, wherein the lipid composition comprises at least 60% triglyceride by weight.

25. The process of claim 1, wherein the lipid composition comprises at least 75% triglyceride by weight.

26. The process of claim 1, wherein the lipid composition comprises at least 85% triglyceride by weight.

27. The process of claim 1, wherein the lipid composition comprises at least 50% neutral lipid by weight.

28. The process of claim 1, wherein the lipid composition comprises at least 50% triglyceride by weight.

29. A lipid composition prepared by the process of claim 1, wherein the lipid composition comprises at least 50% neutral lipid by weight.

30. A lipid composition prepared by the process of claim 1, wherein the lipid composition comprises at least 41% docosahexaenoic acid (DHA) by weight.

31. A lipid composition prepared by the process of claim 1, wherein the lipid composition comprises at least 50% triglyceride by weight.

* * * * *